US012729584B2

(12) United States Patent
Hering et al.

(10) Patent No.: US 12,729,584 B2
(45) Date of Patent: Sep. 8, 2026

(54) JUMP-DETERRENT APPARATUS FOR A TURNSTILE ARM

(71) Applicant: Entry Media, Inc., Winter Park, FL (US)

(72) Inventors: Martin Hering, Winter Park, FL (US); Joseph Holzapfel, Ralston, NE (US)

(73) Assignee: Entry Media, Inc., Winter Park, FL (US)

( * ) Notice: Subject to any disclaimer, the term of this patent is extended or adjusted under 35 U.S.C. 154(b) by 0 days.

(21) Appl. No.: 18/891,387

(22) Filed: Sep. 20, 2024

(65) Prior Publication Data

US 2025/0101804 A1 Mar. 27, 2025

Related U.S. Application Data

(60) Provisional application No. 63/539,910, filed on Sep. 22, 2023.

(51) Int. Cl.
*E06B 11/08* (2006.01)

(52) U.S. Cl.
CPC .................................... *E06B 11/08* (2013.01)

(58) Field of Classification Search
CPC ........................................................ E06B 11/08
USPC ........................................................ D25/48.6
See application file for complete search history.

(56) References Cited

U.S. PATENT DOCUMENTS 3,318,046 A * 5/1967 Lambertson ............ E06B 11/08 49/42
4,044,678 A 8/1977 Rasmussen
5,085,535 A * 2/1992 Solberg ................. F16D 1/0864 403/24
5,390,444 A * 2/1995 Simonin ................. E06B 11/08 49/47
5,430,974 A 7/1995 Hering
5,979,113 A * 11/1999 Hering .................... E06B 11/08 49/46
6,212,809 B1 * 4/2001 Gaule ................... G09F 3/0295 40/661.12
7,096,625 B1 8/2006 Hering
7,845,104 B1 * 12/2010 Holzapfel ............... E06B 11/08 40/661.12
8,210,767 B1 * 7/2012 Swahlan ................. E01F 13/12 404/6
9,121,208 B2 * 9/2015 Nur-tegin ................ E05D 15/02
9,206,642 B2 12/2015 Harucksteiner et al.
(Continued)

FOREIGN PATENT DOCUMENTS

CN 204877234 U 12/2015
CN 210483504 U 5/2020
(Continued)

*Primary Examiner* — Catherine A Kelly

(74) *Attorney, Agent, or Firm* — ALLEN, DYER, DOPPELT + GILCHRIST, P.A.

(57) ABSTRACT

An example of a jump-deterrent apparatus for a turnstile arm includes a turnstile arm receiving member having a tubular section defining a hollow interior through which a turnstile arm can extend along a common axis with the hollow interior. A jump-deterrent section of the turnstile arm receiving member extends radially outward with respect to the common axis. The jump-deterrent section defines a physical barrier extending above the turnstile arm when the turnstile arm is extending through the hollow interior.

19 Claims, 12 Drawing Sheets

(56) References Cited

U.S. PATENT DOCUMENTS

| | | | |
|---|---|---|---|
| 11,873,680 B2 | | 1/2024 | Satrom et al. |
| 2002/0050098 A1 | | 5/2002 | Chan |
| 2008/0240854 A1 | * | 10/2008 | Binns ...................... E06B 11/08 49/46 |
| 2020/0370370 A1 | | 11/2020 | Satrom et al. |

FOREIGN PATENT DOCUMENTS

| | | | | | |
|---|---|---|---|---|---|
| CN | 214170422 | U | | 9/2021 | |
| DE | 2825787 | A1 | | 12/1979 | |
| FR | 2591371 | A1 | * | 6/1987 | .............. E06B 11/08 |
| FR | 2613761 | A1 | * | 10/1988 | .............. E06B 11/08 |
| JP | 4408064 | | | 2/2010 | |
| KR | 100289244 | B1 | * | 5/2001 | .............. E06B 11/08 |
| KR | 101847584 | B1 | | 4/2018 | |

* cited by examiner

JUMP-DETERRENT APPARATUS FOR A TURNSTILE ARM

CROSS-REFERENCE TO RELATED APPLICATION

This claims the benefit of priority from U.S. provisional Application No. 63/539,910, filed Sep. 22, 2023, which is hereby incorporated by reference in its entirety.

FIELD

This relates to turnstiles and, more particularly, to preventing people from jumping over turnstiles.

BACKGROUND

Turnstiles are commonly used to block entry into fee-restricted areas. Unfortunately, many people will attempt to avoid paying the fee by jumping over them. People have attempted to solve this problem; however, conventional solutions are complicated and do not improve the many already existing turnstiles.

BRIEF SUMMARY

What is needed is a jump-deterrent apparatus that is capable of being mounted to an existing turnstile arm and discourages people from jumping turnstile arms.

A first example of such a jump-deterrent apparatus for a turnstile arm comprises a turnstile arm receiving member having a tubular section defining a hollow interior through which a turnstile arm can extend along a common axis with the hollow interior. A jump-deterrent section of the turnstile arm receiving member extends radially outward with respect to the common axis. The jump-deterrent section defines a physical barrier extending above the turnstile arm when the turnstile arm is extending through the hollow interior.

This example of the jump-deterrent apparatus may also include one or more of the following features.

The turnstile arm receiving member and jump-deterrent section may be integral parts of a single piece of molded material.

The turnstile arm receiving member and the jump-deterrent section thereof may be integral parts of a single piece of molded material. The tubular section may define an open first end through which the turnstile arm can extend. The open first end may have screw threads extending therearound, the screw threads being molded.

The jump-deterrent section may be an arc-shaped rigid flap.

The tubular section may define an open first end through which the turnstile arm can extend. The open first end may have screw threads extending therearound, the screw threads having a coarse pitch of 5 to 12 threads per inch.

The turnstile arm receiving member may include two clamps configured to attach the turnstile arm receiving member to the turnstile arm in such a way that the turnstile arm receiving member is prevented from turning about the axis when torque is applied to the jump-deterrent section.

The turnstile arm receiving member and the jump-deterrent section thereof may be integral parts of a single piece of molded material. The tubular section may define an open first end through which the turnstile arm can extend. The open first end may have screw threads extending therearound, the screw threads being molded. The jump-deterrent section may be a semicircular rigid flap extending from the open first end to an open second end. The jump-deterrent section may have its largest radius from the axis at a center of the jump-deterrent section between the open first end and the open second end.

A second example of such a jump-deterrent apparatus for a turnstile arm comprises a tubular sleeve having an interior surface defining a hollow interior configured to receive a turnstile arm along an axis therethrough. A rigid jump-deterrent flap extends radially outward with respect to the axis from an exterior surface of the tubular sleeve. The apparatus further comprises a first attachment member for attaching the tubular sleeve to the turnstile arm in such a way that the tubular sleeve is prevented from turning about the axis when torque is applied to the rigid jump-deterrent flap. When the tubular sleeve is on the turnstile arm, the rigid jump-deterrent flap extends vertically and provides a barrier to a passage over the turnstile arm.

This example of the jump-deterrent apparatus may also include one or more of the following features.

The exterior surface of the tubular sleeve may define a first open end and a second open end. The interior surface may extend from the first open end to the second open end. The first attachment member and the exterior surface around the first open end may have mating screw threads for screwing the first attachment member to the first open end. The first attachment member may clamp to the turnstile arm.

The rigid jump-deterrent flap and the tubular sleeve may be integral parts of a single piece of molded material.

The rigid jump-deterrent flap and the tubular sleeve may be integral parts of a single piece of molded material. The tubular sleeve may define an open first end through which the turnstile arm can extend. The open first end may have screw threads extending therearound, the screw threads being molded.

The rigid jump-deterrent flap may be arc shaped.

The tubular sleeve may define an open first end through which the turnstile arm can extend. The open first end may have screw threads extending therearound. The screw threads may have a coarse pitch of 5 to 12 threads per inch.

The first attachment member may include two clamps configured to clamp the tubular sleeve to the turnstile arm, the clamps being adjustable independently of one another.

An example of a method comprises installing a jump-deterrent device on a turnstile arm by inserting the turnstile arm into a tubular section of a turnstile arm receiving member along a common axis with the tubular section. The turnstile arm receiving member includes a jump-deterrent section extending radially outward with respect to the common axis. The method further comprises orienting the jump-deterrent section about the turnstile arm in such a way that the jump-deterrent section extends vertically over the turnstile arm and provides a physical barrier to passage over the turnstile arm and attaching the turnstile arm receiving member to the turnstile arm.

The method may also include one or more of the following features.

The step of attaching the turnstile arm receiving member to the turnstile arm may be achieved in such a way that the turnstile arm receiving member is prevented from rotating about the turnstile arm when torque is applied to the jump-deterrent section.

The turnstile arm receiving member and the jump-deterrent section thereof may be integral parts of a single piece of molded material. The tubular section may define an open first end through which the turnstile arm can extend. The open first end may have screw threads extending therearound, the screw threads being molded.

The jump-deterrent section may be an arc-shaped rigid flap.

The turnstile arm receiving member may include two clamps configured to attach the turnstile arm receiving member to the turnstile arm in such a way that the turnstile arm receiving member is prevented from turning about the axis when torque is applied to the jump-deterrent section.

The turnstile arm receiving member and the jump-deterrent section thereof may be integral parts of a single piece of molded material. The tubular section may define an open first end through which the turnstile arm extends. The open first end may have screw threads extending therearound, the screw threads being molded. The jump-deterrent section may be a semicircular rigid flap extending from the open first end to an open second end. The jump-deterrent section may have its largest radius from the axis at a center of the jump-deterrent section between the open first end and the open second end.

DESCRIPTION

This disclosure describes examples and features, but not all possible examples and features of the apparatus and methods. Where a particular feature is disclosed in the context of a particular example, that feature can also be used, to the extent possible, in combination with and/or in the context of other examples. The apparatus and methods may be embodied in many different forms and should not be construed as limited to only the examples described here.

The jump-deterrent apparatus provides an advantageous solution to the problem of fare evasion. The jump-deterrent apparatus makes it more difficult to jump over a turnstile by placing a barrier over the turnstile arm. The jump deterrent apparatus is also designed to be easily mounted and firmly secured to a turnstile arm. It is also easy for trained technicians to remove, yet difficult to remove by the typical, untrained person. The jump deterrent apparatus is designed to not damage existing turnstile arms and not impede or slow normal egress or ingress of a turnstile passageway. It is safe for people entering and exiting through turnstiles.

Figure 1:
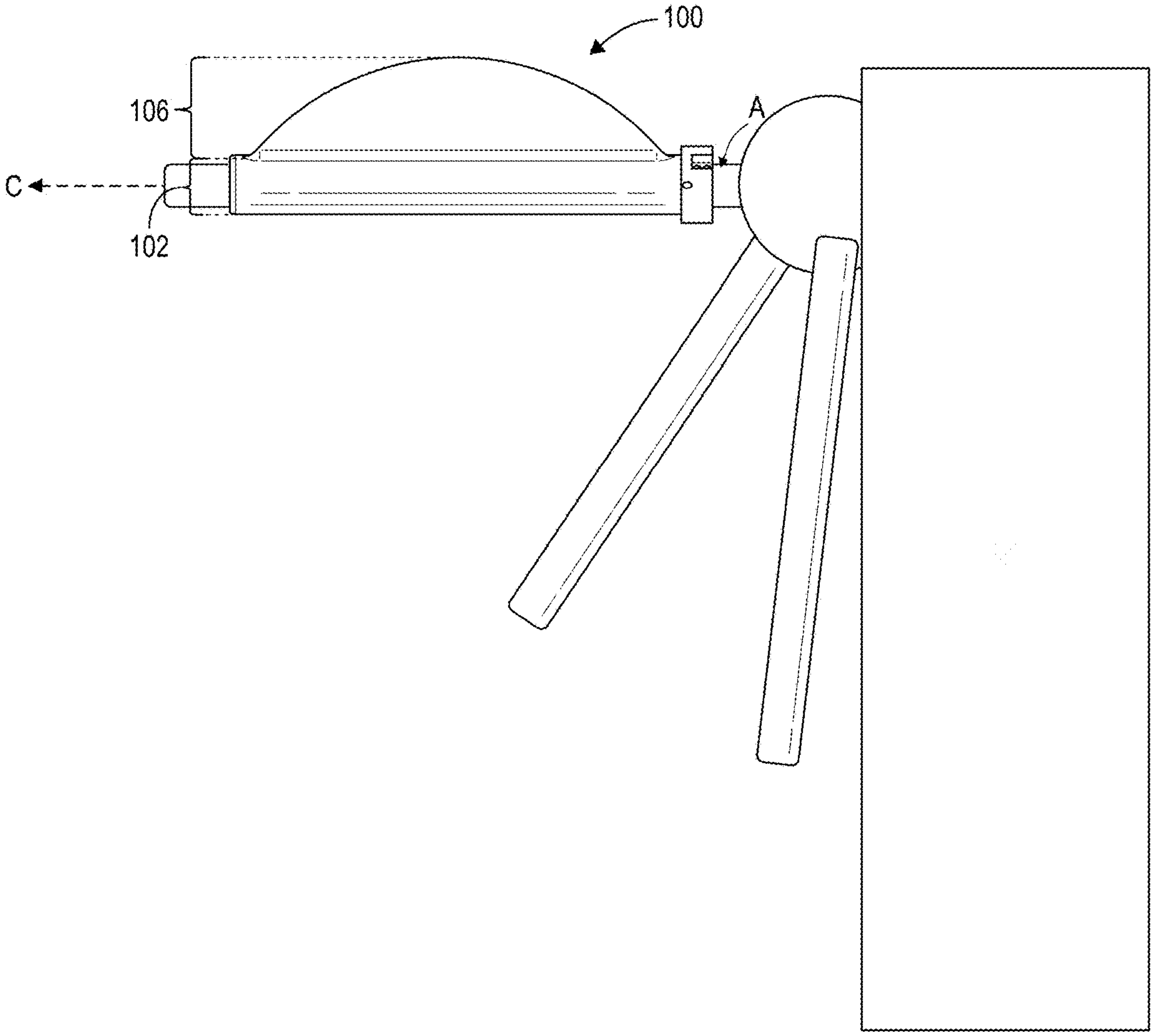
FIG. 1 is a side view of an example of the jump-deterrent apparatus attached to a turnstile arm.
Figure 2:
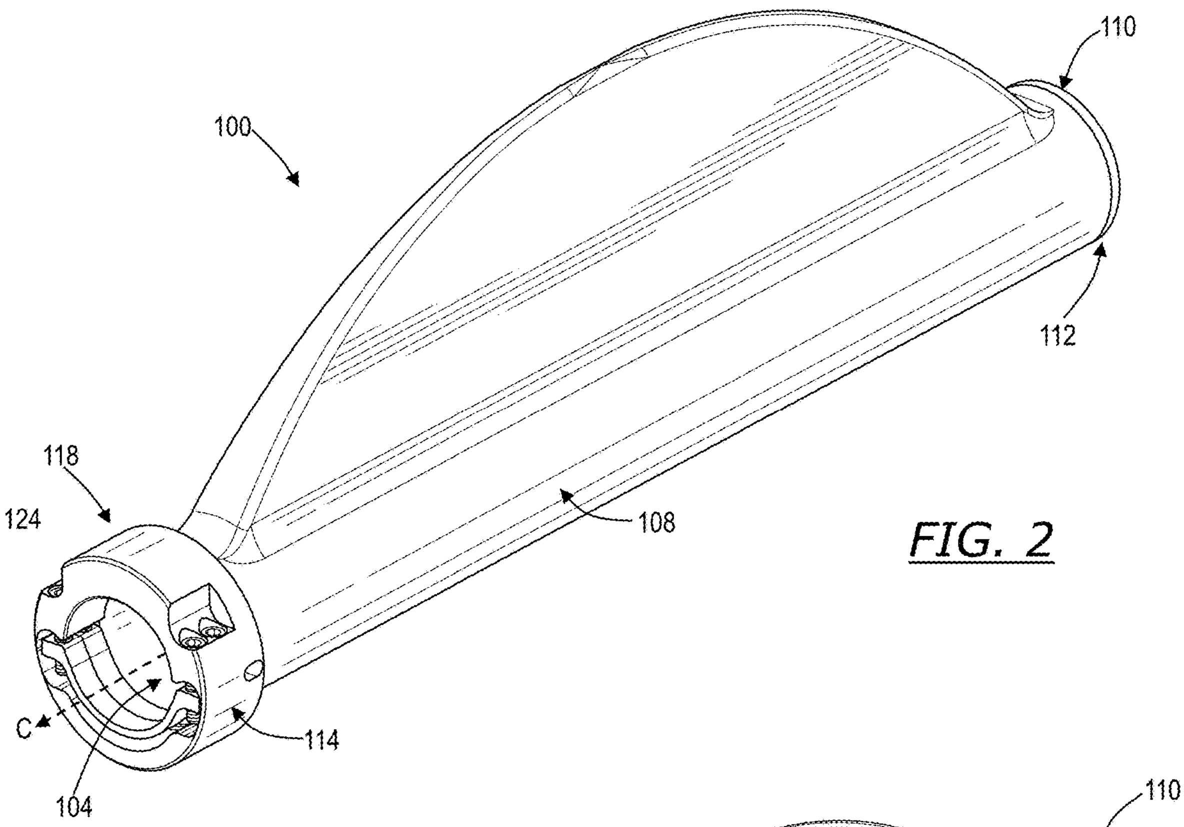
FIG. 2 is a front perspective view of the jump-deterrent apparatus.
Figure 3:
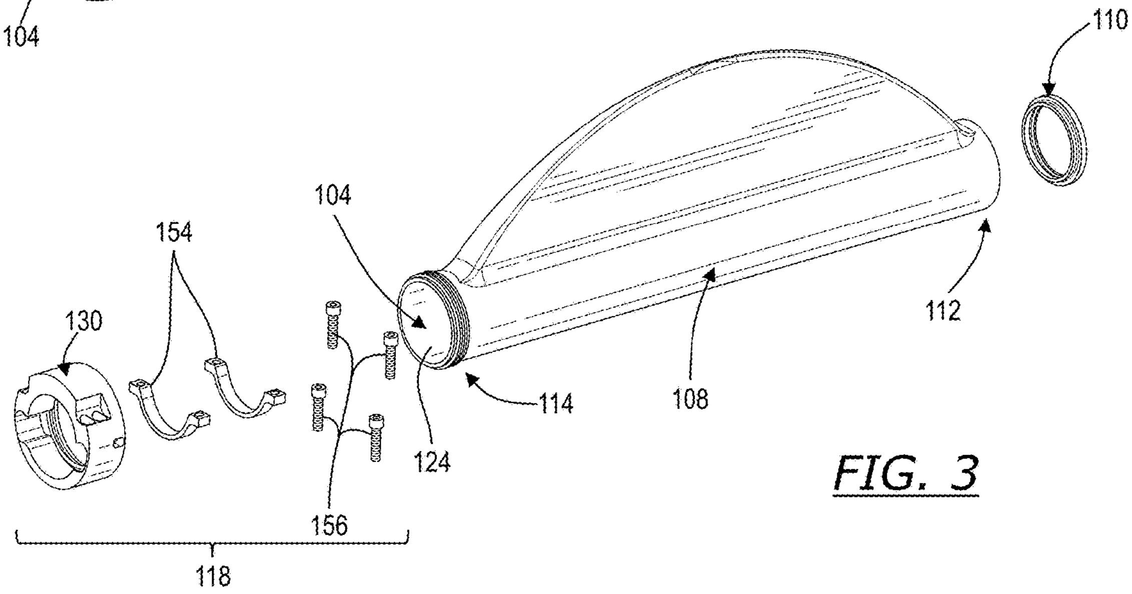
FIG. 3 is an exploded front perspective view of the jump-deterrent apparatus.
Figure 4:
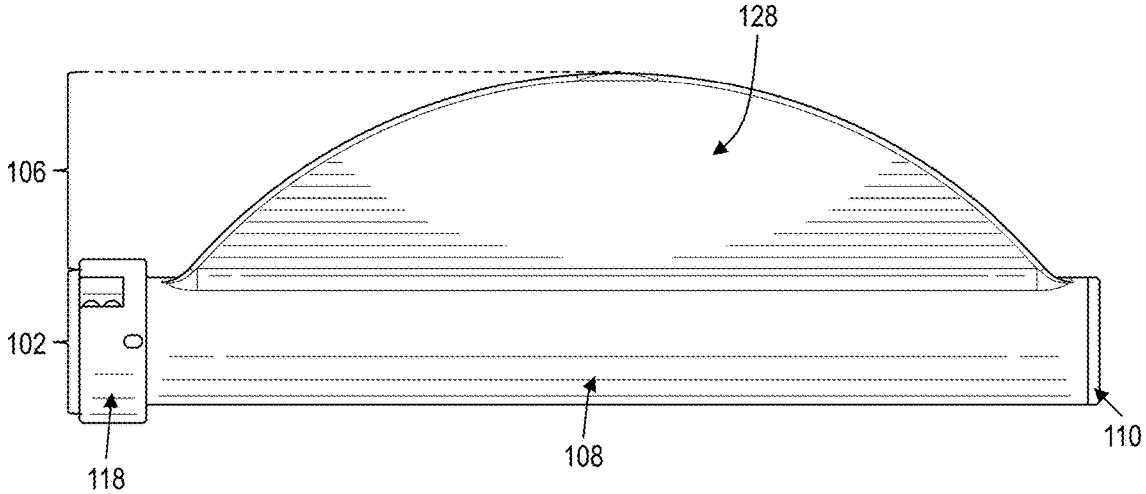
FIG. 4 is a right-side view of the jump-deterrent apparatus.
Figure 5:
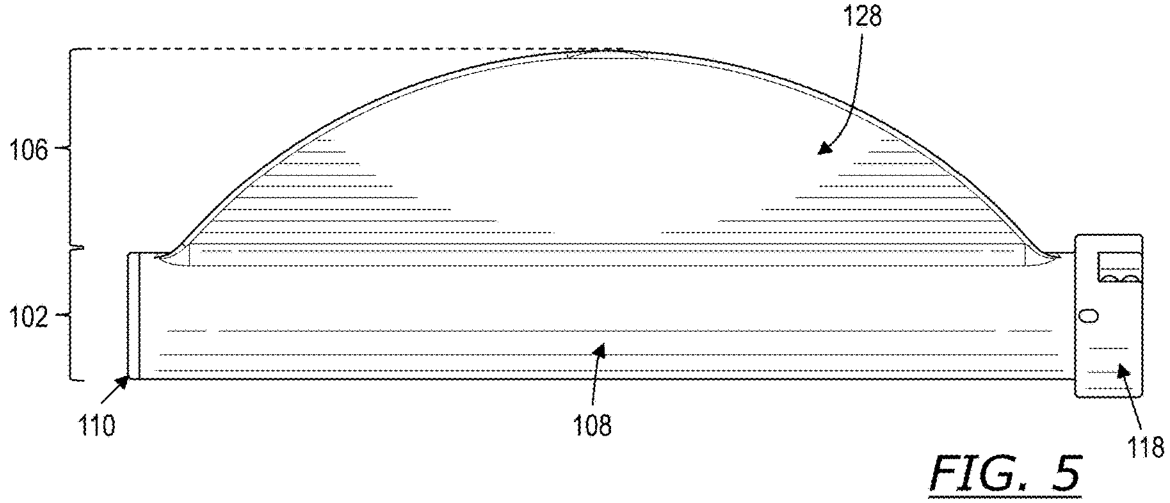
FIG. 5 is a left-side view of the jump-deterrent apparatus.
Figure 6:
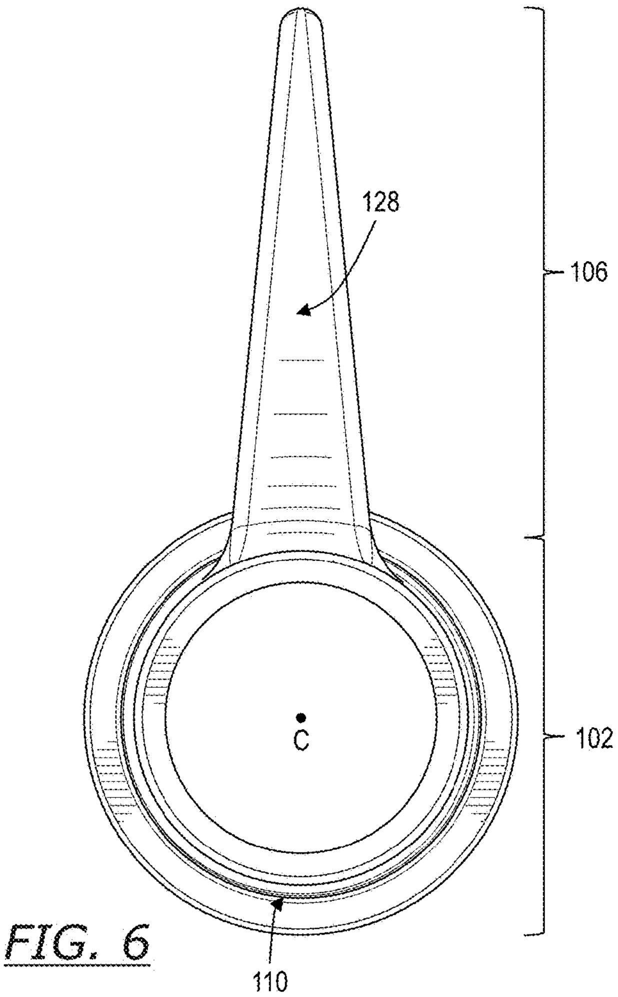
FIG. 6 is a back view of the jump-deterrent apparatus.
Figure 7:
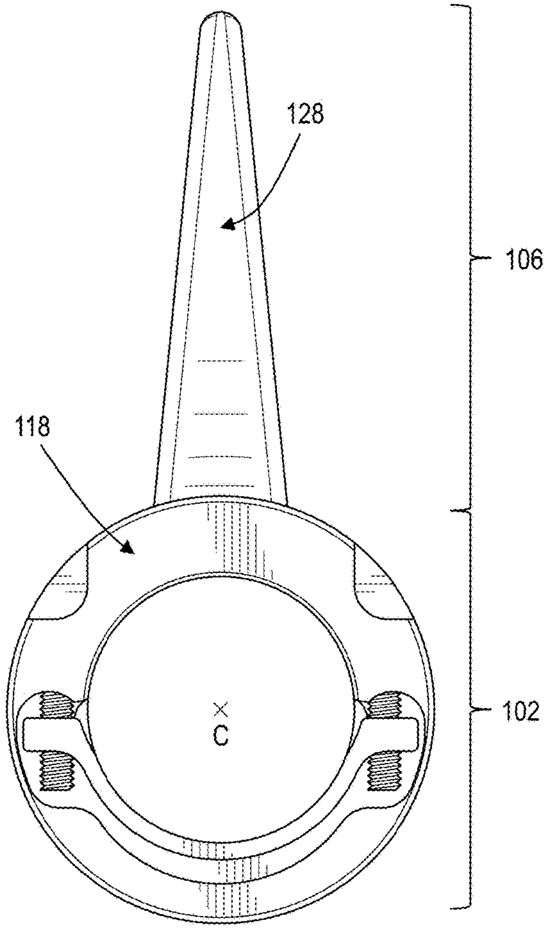
FIG. 7 is a front view of the jump-deterrent apparatus.
Figure 8:
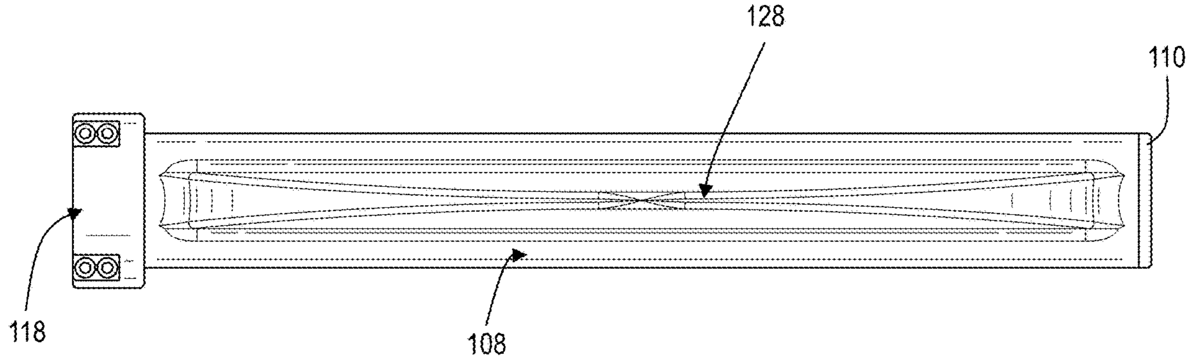
FIG. 8 is a top view of the jump-deterrent apparatus.
Figure 9:
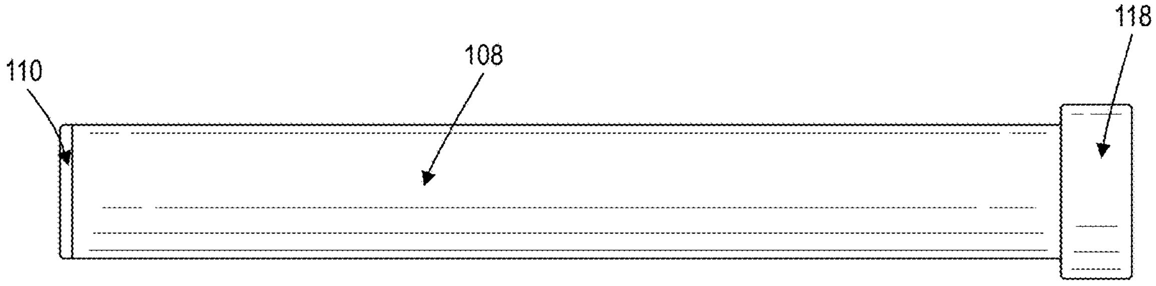
FIG. 9 is a bottom view of the jump-deterrent apparatus.

Referring to FIG. 1, an example of the turnstile arm receiving member 100 is installed on a turnstile arm A. The turnstile arm receiving member 100 has a tubular section 102 defining a hollow interior 104 through which the turnstile arm A can extend along a common axis C with the hollow interior 104. A jump-deterrent section 106 of the turnstile arm receiving member 100 extends radially upward with respect to the common axis C and defines a physical barrier extending above the turnstile arm A when the turnstile arm receiving member 100 is installed on the turnstile arm A. This physical barrier is designed to make it difficult for people to jump over the turnstile arm A to avoid paying a fare.

Referring to FIGS. 2-9, the the tubular section 102 includes a sleeve 108, a collar 110, and an attachment member 118. The attachment member 118 is attached to a first end 114 of the sleeve 108 and the collar 110 is attached to a second end 112 of the sleeve 108. The first end 114 of the sleeve 108 includes sleeve threads 116 that mate with the attachment member 118. The attachment member 118 is configured to secure the turnstile arm receiving member 100 to the turnstile arm A in such a way that the turnstile arm A is resistant to rotating about the turnstile arm A if someone pushes, kicks, or otherwise applies a torque to the jump-deterrent section 106.

Figure 10:
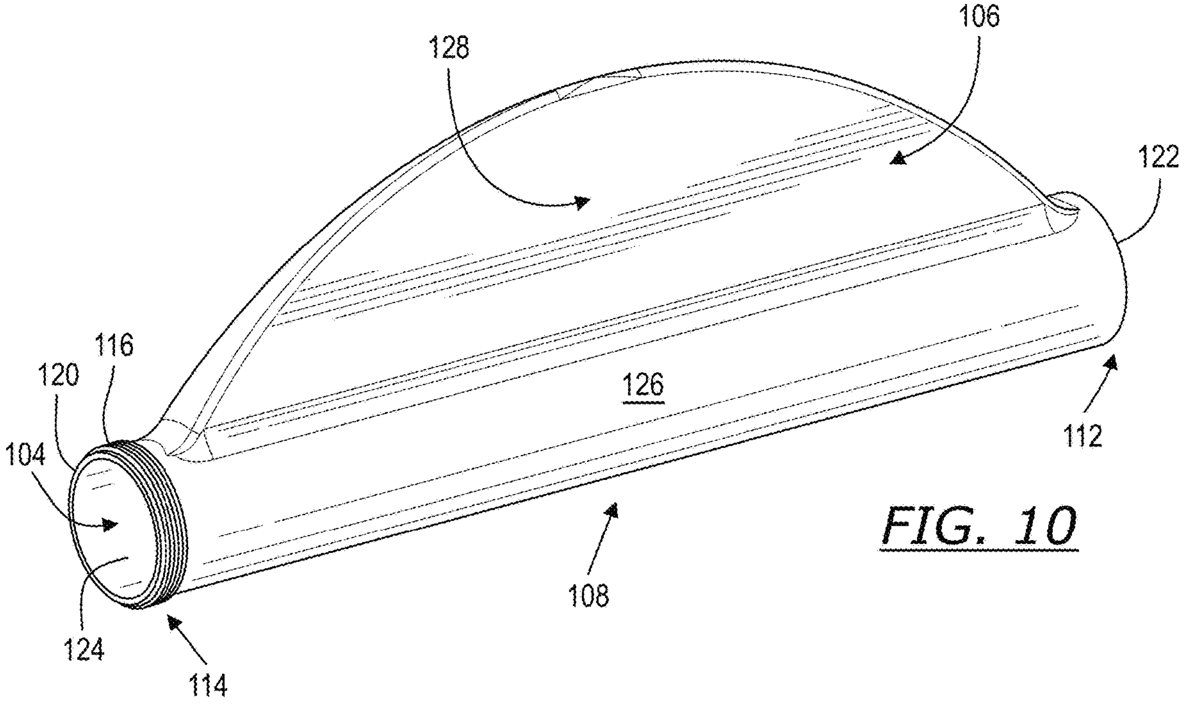
FIG. 10 is a front perspective view of an example of a sleeve.
Figure 11:
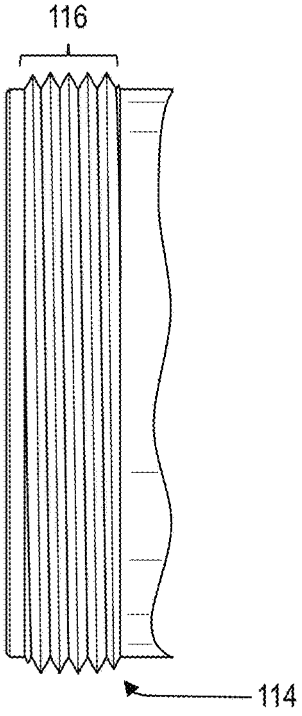
FIG. 11 is a side zoom view of a first end of the sleeve.
Figure 12:
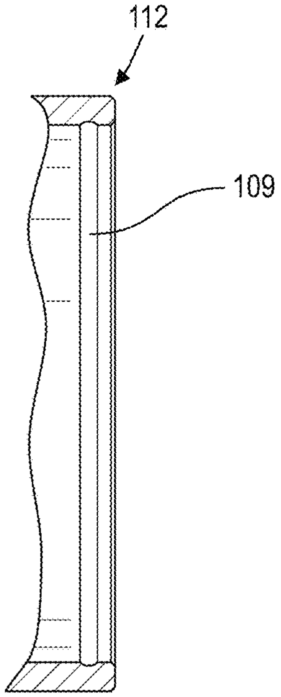
FIG. 12 is a cross-section side zoom view of a second end of the sleeve.
Figure 13:
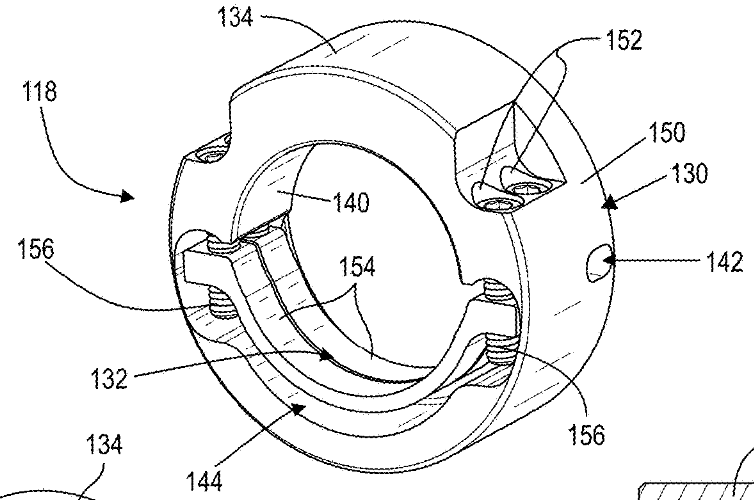
FIG. 13 is a front perspective view of an example of an attachment member.
Figure 14:
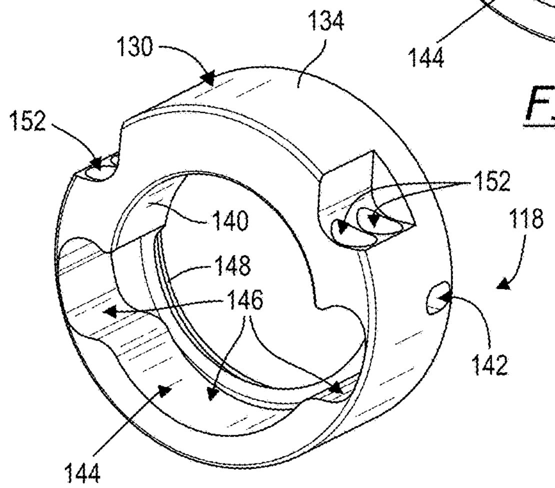
FIG. 14 is a front perspective view of an example of a flange.
Figure 15:
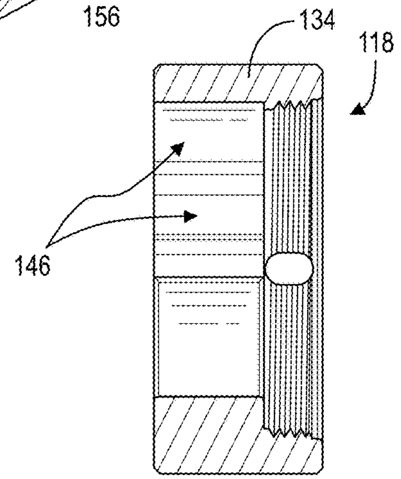
FIG. 15 is a side cross-section of the flange.
Figure 16:
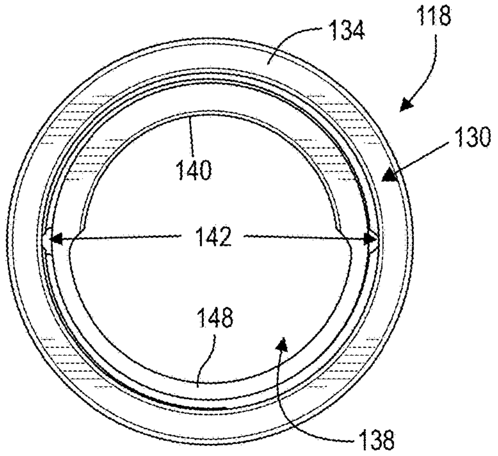
FIG. 16 is a back view of the flange.
Figure 17:
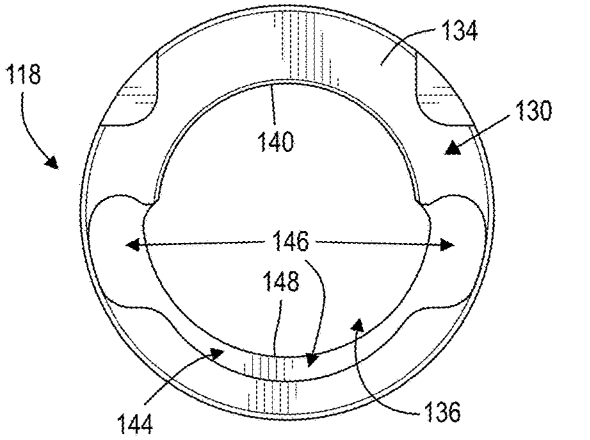
FIG. 17 is a front view of the flange.
Figure 18:
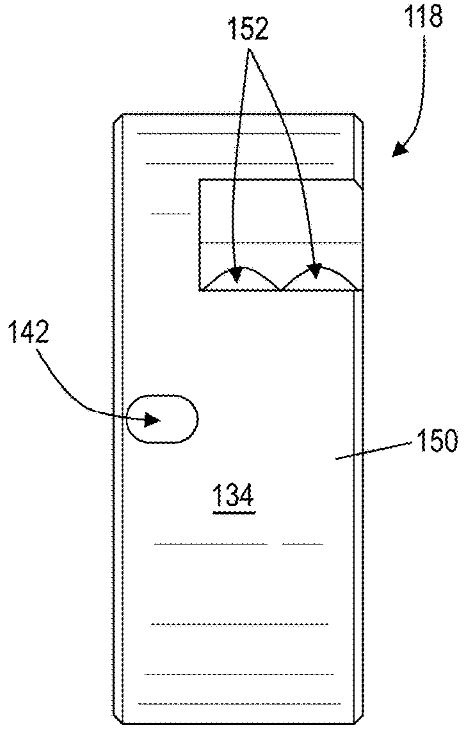
FIG. 18 is a left-side view of the flange.
Figure 19:
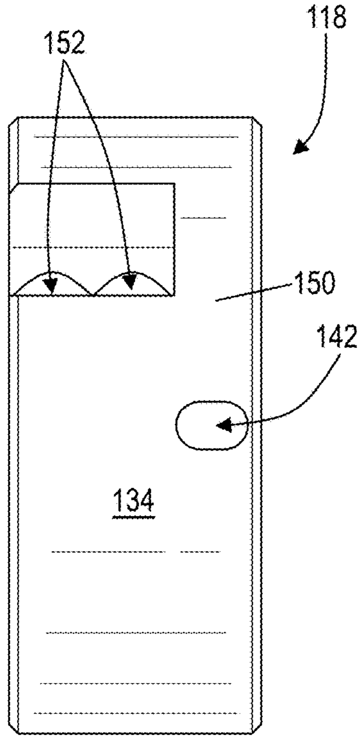
FIG. 19 is a right-side view of the flange.
Figure 20:
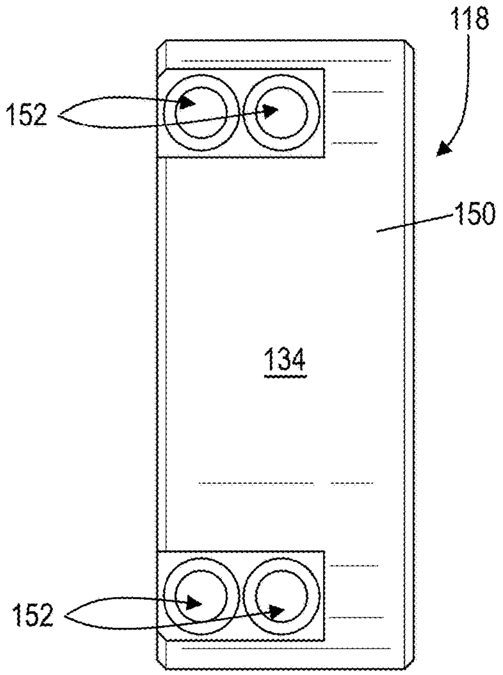
FIG. 20 is a top view of the flange.
Figure 21:
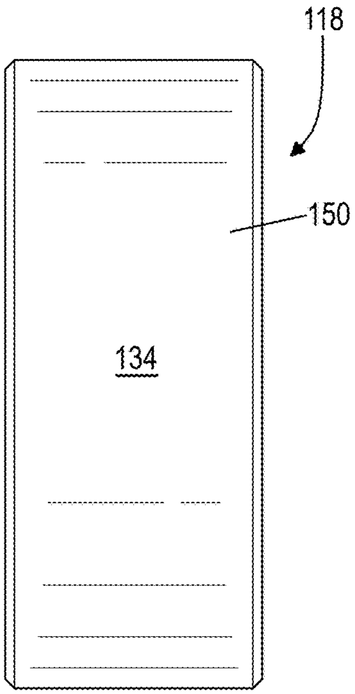
FIG. 21 is a bottom view of the flange.
Figure 22:
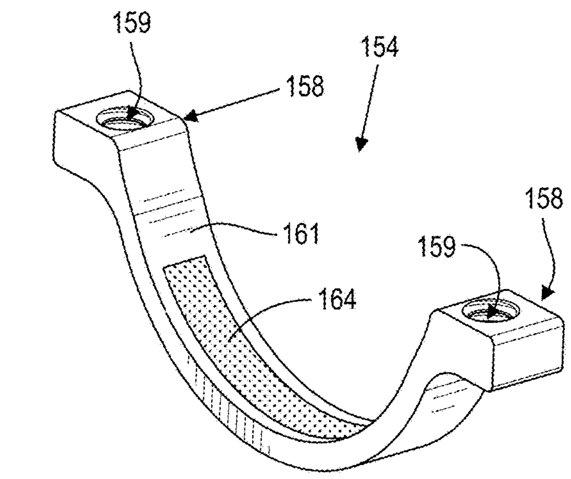
FIG. 22 is a front perspective view of an example of a clamp.
Figure 23:
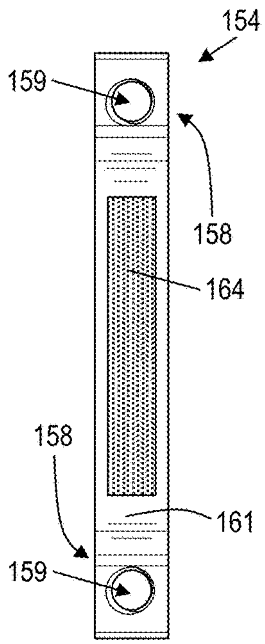
FIG. 23 is a top view of the clamp.
Figure 24:
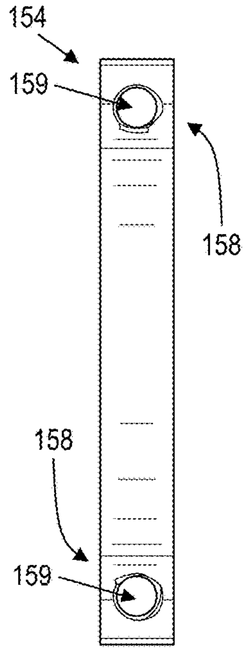
FIG. 24 is a bottom view of the clamp.
Figure 25:
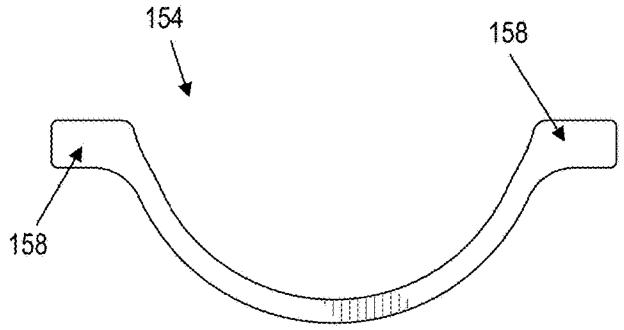
FIG. 25 is a front view of the clamp.
Figure 26:
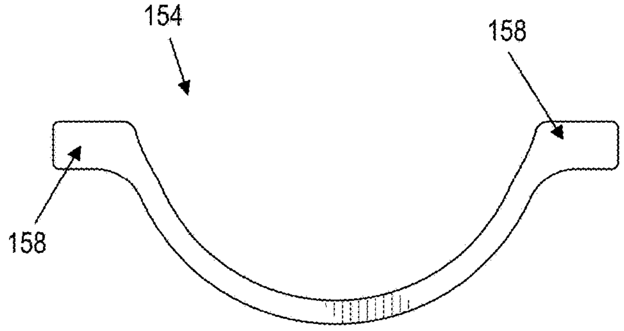
FIG. 26 is a back view of the clamp.

Referring to FIGS. 10-12, the sleeve 108 is shown without the collar 110 and attachment member 118. A tubular section 102 defines a first opening 120 at the first end 114 and a second opening 122 at the second end 112. A tubular section 102 interior surface 124 of the tubular section 102 defines the hollow interior 104 for receiving the turnstile arm A. The hollow interior 104 is substantially cylindrical in this example because the turnstile arm A is cylindrical. If the turnstile arm A were square, triangular, or another shape, the hollow interior 104 could be shaped to mimic the shape of the turnstile arm A.

The sleeve 108 may be made of plastic, metal, or the like. When it is desirable to limit the weight of the turnstile arm receiving member 100, the sleeve 108 is typically made of plastic. In certain examples, the sleeve 108 is a single molded piece of material or 3D printed material.

Forces applied to the jump-deterrent section 106 create a torque about the axis C. Therefore, it may be desirable to make the sleeve 108 as strong, yet light, as possible out of plastic. In such cases, machining the sleeve threads 116 after molding the sleeve 108 may weaken the plastic at the first end 114 and decrease the life span of the turnstile arm receiving member 100. This problem is avoided by molding the sleeve threads 116 into the sleeve 108 when the plastic is molded into the sleeve 108.

To further improve the integrity of the plastic at the first end 114 and provide firm holding power to the attachment member 118, the sleeve threads 116 are coarse threads, typically 5 to 12 threads per inch. If integrity of the sleeve 108 material is not a problem, finer threads may be used.

The second end 112 of the sleeve 108 includes a groove 109 extending circumferentially along the tubular section 102 interior surface 124 for mating with the collar 110 which snaps into and may be glued into the groove 109.

The sleeve 108 also includes a sleeve exterior surface 126 defining an outer perimeter of the sleeve 108. The jump-deterrent section 106 extends radially upward from the sleeve exterior surface 126 with respect to the axis C. The jump-deterrent section 106 may have many different forms so long as it creates a physical barrier above the turnstile arm A when installed thereon.

In the example shown, the jump-deterrent section 106 is a rigid flap 128 extending parallel to the axis C. The rigid flap 128 extends upwardly from the sleeve exterior surface 126. This rigid flap 128 can have a semicircular shape or be arc shaped, such that the rigid flap 128 has its farthest point from the axis C at about a lateral center of the sleeve 108. In other examples, the upward projection may have a different shape such as a square, triangular, wave, sawtooth, and many others.

In the example shown, the entire sleeve 108 including the tubular section 102 and jump-deterrent section 106 are molded as integral parts of a single piece of material or 3D printed. Molding the sleeve out of a single piece of material may provide the sleeve 108 with good mechanical integrity, which is needed when someone applies a force to the jump-deterrent section while trying to jump over the turnstile arm A.

Referring to FIGS. 13-17, the attachment member 118 includes a flange 130 and a clamping mechanism 132. The flange 130 includes a body 134 defining a first flange opening 136 and a second flange opening 138 on opposing sides of a flange interior surface 140. Proximal to the second flange opening 138, the flange interior surface 140 is threaded to mate with the sleeve threads 116 on the sleeve 108. The body 134 further defines a pair of opposed adhesive ports 142 extending from an outside of the body 134 to the flange interior surface 140. The adhesive ports 142 allow adhesive 164 to be applied to the sleeve threads 116 when the sleeve 108 and flange 130 are screwed together.

Inside the first flange opening 136, the flange interior surface 140 defines a clamping mechanism receiving section 144. The clamping mechanism receiving section 144 includes a cutout 146 extending from a left side to a right side of the flange 130. The cutout 146 gives the flange interior surface 140 a larger radius than the flange interior surface 140 opposite the cutout 146. The cutout 146 defines a lip 148 in the flange interior surface 140. At the lip 148, the radius of the flange interior surface 140 increases.

A body exterior surface 150 defines opposed fastener openings 152 that pass through the body exterior surface 150 to the flange interior surface 140. The fastener openings 152 receive fasteners 156 such as screws, bolts, or the like that mate with the clamping mechanism 132. The fastener openings 152 may be threaded or unthreaded.

The clamping mechanism 132 includes at least one clamp 154 that fits in the cutout 146 and mates with fasteners 156 through the fastener openings 152 to clamp the attachment member 118 to the turnstile arm A. Referring to FIGS. 22-26, the clamp 154 includes a pair of opposed arms 158 defining fastener holes 159 that receive the fasteners 156. Between the opposed arms 158, the clamp 154 is substantially U-shaped to mimic the curvature of the cutout 146. When the fasteners 156 are tightened, the clamp 154 raises to press against the turnstile arm A. In the example shown, the attachment member 118 includes two clamps 154 for redundancy. If one clamp 154 loosens, the other clamp 154 may remain tight to keep the attachment member 118 secured to the turnstile arm A.

An upper surface 161 of the clamp 154 may include a slip resistant adhesive 164. The slip-resistant adhesive 164 is designed to further mitigate the attachment member 118 from slipping and turning around the axis C when force is applied to the physical barrier. In certain examples, such as the example shown, the slip-resistant adhesive 164 is an adhesive tape or the like. In other examples, the slip-resistant adhesive 164 may also be applied to the flange interior surface 140.

The attachment member 118 may be made from rigid material capable of securely clamping the attachment member 118 to the turnstile arm A. In certain examples, the attachment member 118 is made of metal. When reduced weight is desired, the metal chosen may be aluminum. Other materials may, however, be used in other examples.

Figure 27:
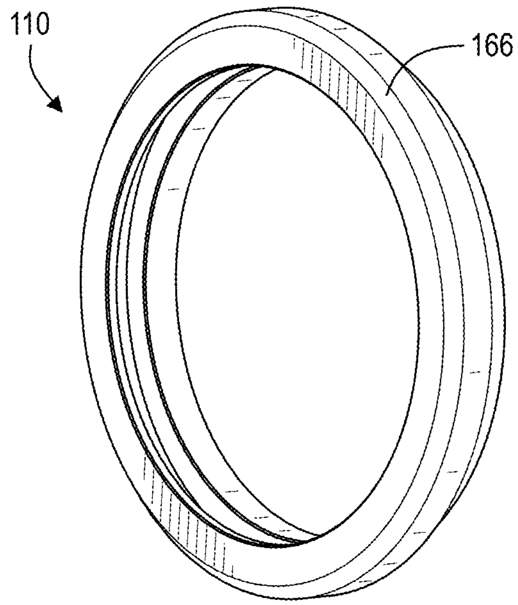
FIG. 27 is a front perspective view of an example of the collar.
Figure 28:
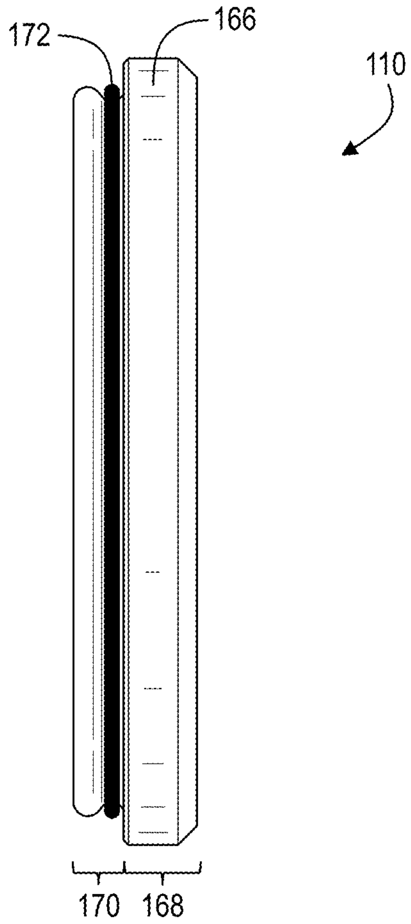
FIG. 28 is a side view of the collar.

Referring to FIGS. 27-28, the collar 110 includes a ring having a collar exterior surface 166 having a radially enlarged section 168 and a radially constricted section 170. The radially constricted section 170 includes a gasket 172 such as an O-ring, AN seal, or the like. The gasket fits against the groove in the second end 112 of the sleeve 108 for mating the collar 110 to the sleeve 108. The purpose of the collar 110 is to strengthen the second opening 122 of the sleeve 108.

The collar 110 may be made from rigid material. In certain examples, the collar 110 is made of metal. When reduced weight is desired, the metal chosen may be aluminum. Other materials may, however, be used in other examples.

Figure 29:
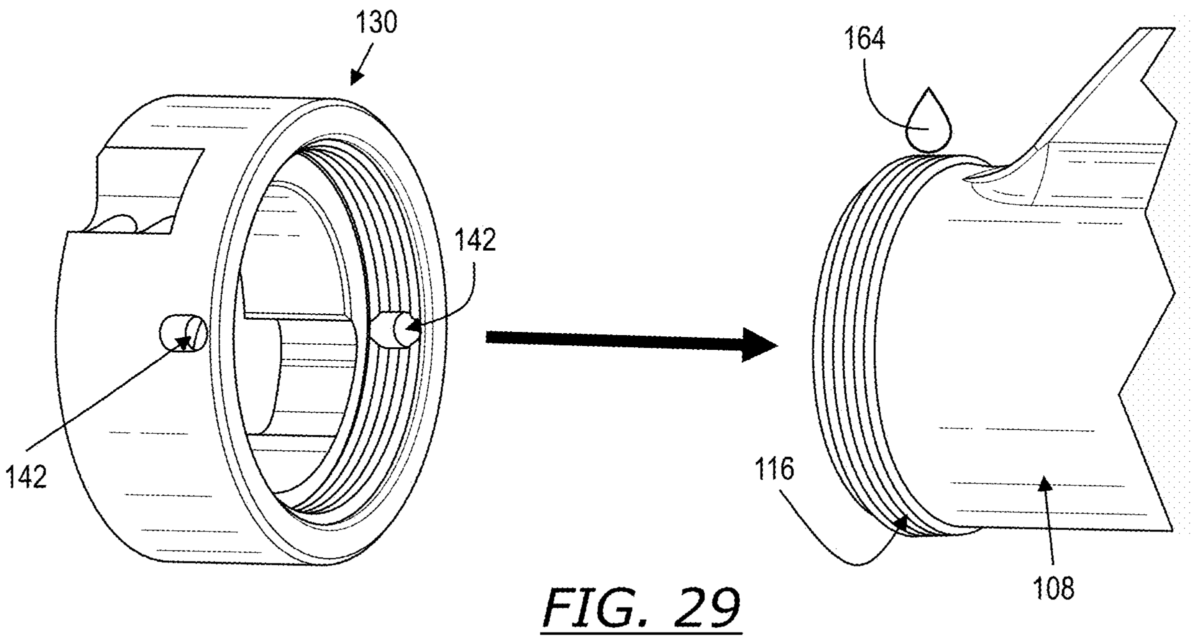
FIG. 29 is a perspective view of the flange being attached to the sleeve.
Figure 30:
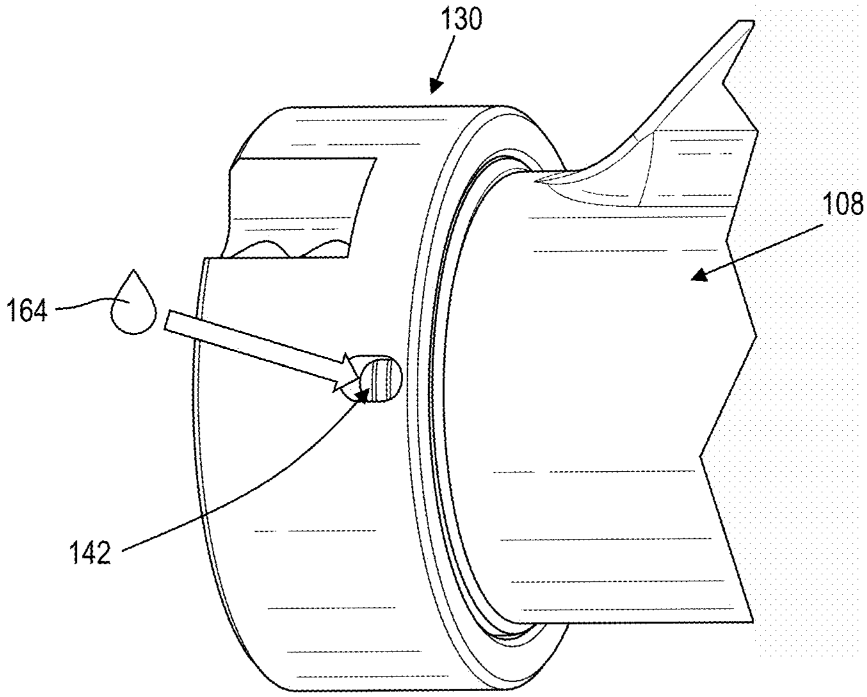
FIG. 30 is a perspective view of the flange attached to the sleeve.

Referring to FIGS. 29-30, it may sometimes be desirable to strengthen the connection between the attachment member 118 and sleeve 108 further than merely relying on the coarse sleeve threads 116. To do this, adhesive 164 may be applied to the sleeve threads 116 prior to screwing on the flange 130. The attachment member 118 may then be screwed on and the adhesive 164 left to dry. Once the adhesive 164 is dry, additional adhesive 164 may be applied through the adhesive ports 142 to further adhere the attachment member 118 to the sleeve 108. Once the additional adhesive 164 dries, it is difficult to unscrew the attachment member 118 from the sleeve 108.

Figure 31:
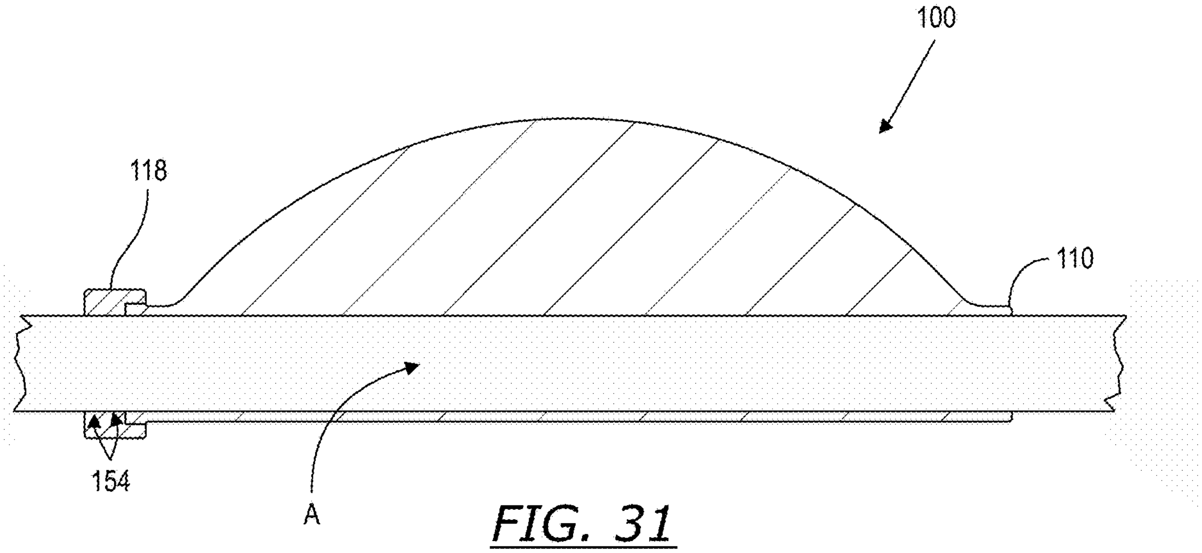
FIG. 31 is side cross section view of the jump-deterrent apparatus with a turnstile arm extending through the hollow interior.

Referring to FIG. 31, the turnstile arm receiving member 100 is shown as a cross-section with a turnstile arm A extending through the hollow interior 104 along the axis C. The two clamps 154 are tightened against the turnstile arm A to substantially prevent the turnstile arm A from rotating about the axis C when the turnstile arm receiving member 100 is installed. As used herein, the meaning of the term “prevent” includes that rotation is substantially prevented when a person jumping over the turnstile arm A hits the jump-deterrent section 106.

Figure 32:
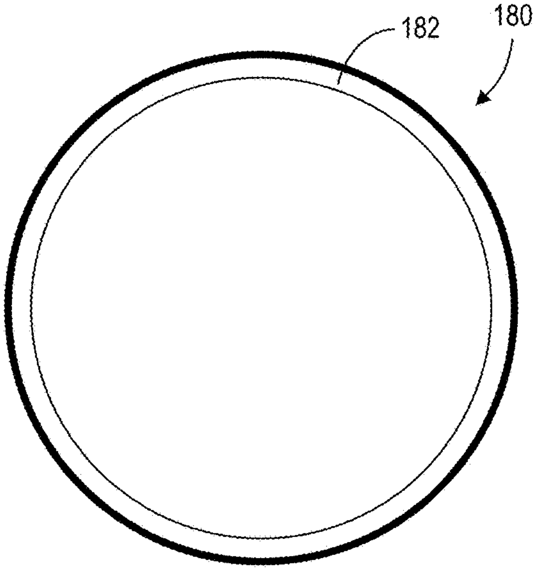
FIG. 32 is a front view of a locking mechanism.
Figure 33:
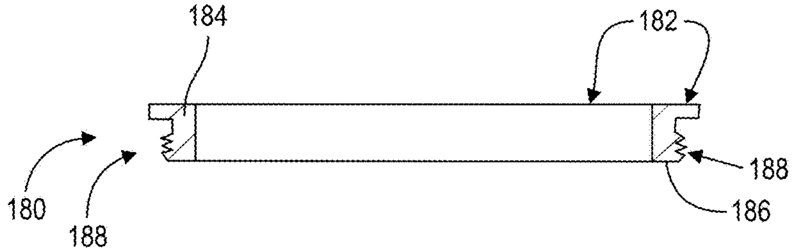
FIG. 33 is a cross section view of the locking mechanism.

Referring to FIGS. 32-33, a locking mechanism 180 may be used to further secure the connection between the flange 130 and the sleeve 108. The locking mechanism 180 includes a ring 182 having a front face 184 and a rear face 186. The front face 184 is substantially flat. The ring 182 includes a threaded section 188 having threads that mate with threads along the interior surface 124 of the sleeve 108 at the first end 114. These threads have the opposite handedness relative to the sleeve threads 116. The locking mechanism 180 may be screwed into the sleeve 108 such that the front face 184 contacts the flange 130 when the flange 130 is screwed onto the sleeve 108. Threading the flange 130 and locking mechanism 180 with opposite threads helps prevent the flange 130 spinning loose because the threads of the flange 130 and locking mechanism 180 actuate against each other.

The apparatus and methods are not limited to the details described in connection with the example embodiments. There are numerous variations and modifications of the compositions and methods that may be made without departing from the scope of what is claimed.

That which is claimed is:

1. A jump-deterrent apparatus for a turnstile arm, the jump-deterrent apparatus comprising:

a tubular section defining a hollow interior configured to receive a turnstile arm along a common axis, the tubular section extending longitudinally between a first end and a second end;

a rigid jump-deterrent section extending radially outward from the tubular section with respect to the common axis and extending longitudinally along the tubular section between the first end and the second end, the rigid jump-deterrent section being configured to define a physical barrier extending above the turnstile arm when the tubular section is installed on the turnstile arm;

wherein the rigid jump-deterrent section is configured such that contact with the rigid jump-deterrent section by a person attempting to pass over the turnstile arm applies rotational torque about the common axis to the tubular section;

wherein the jump-deterrent apparatus is configured as a retrofit device mountable to an existing turnstile arm without replacement of the turnstile arm; and an attachment assembly coupled to the tubular section and including a plurality of clamping locations spaced apart along the common axis, each clamping location including at least one clamp configured to engage the turnstile arm, the attachment assembly being configured to resist the rotational torque applied to the tubular section and substantially prevent rotational movement of the tubular section about the common axis when the rotational torque is applied to the rigid jump-deterrent section.

2. The jump-deterrent apparatus of claim 1, wherein the tubular section and the rigid jump-deterrent section are integrally molded or additively manufactured as a single rigid piece of material.

3. The jump-deterrent apparatus of claim 1, wherein the tubular section defines the open first end through which the turnstile arm can extend, the open first end having molded screw threads extending therearound for coupling the attachment assembly to the tubular section, and wherein the molded screw threads are coarse threads having between 5 and 12 threads per inch.

4. The jump-deterrent apparatus of claim 1, wherein the jump-deterrent section is an arc-shaped rigid flap extending longitudinally along the tubular section.

5. The jump-deterrent apparatus of claim 1, wherein the tubular section defines the open first end through which the turnstile arm can extend, the open first end having molded screw threads extending therearound for coupling the attachment assembly to the tubular section, the molded screw threads having a coarse pitch of 5 to 12 threads per inch.

6. The jump-deterrent apparatus of claim 1, wherein the tubular section and the rigid jump-deterrent section are integrally molded as a single rigid body;

the tubular section defines the open first end through which the turnstile arm can extend, the open first end having molded screw threads extending therearound for coupling the attachment assembly to the tubular section; and the rigid jump-deterrent section comprises a semicircular rigid flap extending longitudinally between the open first end and the open second end and having a largest radial distance from the common axis at a center portion between the open first end and the open second end.

7. A jump-deterrent apparatus for a turnstile arm, the jump-deterrent apparatus comprising:

a tubular sleeve defining a hollow interior configured to receive a turnstile arm along a common axis, the tubular sleeve extending longitudinally between a first end and a second end;

a rigid jump-deterrent section extending radially outward from the tubular sleeve with respect to the common axis and extending longitudinally along the tubular sleeve between the first end and the second end, the rigid jump-deterrent section being configured to define a physical barrier extending above the turnstile arm when the tubular sleeve is installed on the turnstile arm;

wherein the rigid jump-deterrent section is configured such that contact with the rigid jump-deterrent section by a person attempting to pass over the turnstile arm applies rotational torque about the common axis to the tubular sleeve;

an attachment assembly coupled to the tubular sleeve and including a plurality of clamping locations spaced apart along the common axis, each clamping location including at least one clamp configured to engage the turnstile arm, the attachment assembly being configured to resist the rotational torque applied to the tubular sleeve and substantially prevent rotational movement of the tubular sleeve about the common axis when the rotational torque is applied to the rigid jump-deterrent section; and wherein, when the tubular sleeve is installed on the turnstile arm, the rigid jump-deterrent section extends substantially vertically and provides a physical barrier above the turnstile arm.

8. The jump-deterrent apparatus of claim 7, wherein:

the exterior surface of the tubular sleeve defines a first open end and a second open end;

the interior surface extends from the first open end to the second open end;

the attachment assembly and the exterior surface around the first open end have mating screw threads for coupling the attachment assembly to the first open end; and the attachment assembly includes at least one clamp configured to engage the turnstile arm to substantially prevent rotational movement of the tubular sleeve about the common axis when rotational torque is applied to the rigid jump-deterrent section.

9. The jump-deterrent apparatus of claim 7, wherein the rigid jump-deterrent section and the tubular sleeve are integrally molded or additively manufactured as a single piece of rigid material.

10. The jump-deterrent apparatus of claim 7, wherein:

the rigid jump-deterrent section and the tubular sleeve are integrally molded as one piece of material; and the tubular sleeve defines an open first end through which the turnstile arm can extend, the open first end having molded screw threads extending therearound for coupling the attachment assembly to the tubular sleeve.

11. The jump-deterrent apparatus of claim 7, wherein the rigid jump-deterrent section comprises an arc-shaped rigid flap extending longitudinally along the tubular sleeve.

12. The jump-deterrent apparatus of claim 7, wherein the tubular sleeve defines an open first end through which the turnstile arm can extend, the open first end having molded screw threads extending therearound for coupling the attachment assembly to the tubular sleeve, the molded screw threads having a coarse pitch of 5 to 12 threads per inch.

13. The jump-deterrent apparatus of claim 7, wherein the attachment assembly includes a plurality of clamping locations spaced apart along the common axis, each clamping location including at least one independently adjustable clamp configured to engage the turnstile arm and resist rotational movement of the tubular sleeve about the common axis when rotational torque is applied to the rigid jump-deterrent.

14. A method comprising installing a jump-deterrent device on a turnstile arm by:

inserting the turnstile arm into a tubular section of a jump-deterrent apparatus along a common axis with the tubular section, the jump-deterrent apparatus including a jump-deterrent section extending radially outward with respect to the common axis;

orienting the jump-deterrent section about the turnstile arm in such a way that the jump-deterrent section extends substantially vertically above the turnstile arm and provides a physical barrier to passage over the turnstile arm; and coupling an attachment assembly of the jump-deterrent apparatus to the turnstile arm such that rotational movement of the tubular section about the common axis is substantially prevented when torque is applied to the jump-deterrent section by contact with a person attempting to pass over the turnstile arm.

15. The method of claim 14, wherein the attachment assembly includes a plurality of clamping locations spaced apart along the common axis, each clamping location including at least one clamp configured to engage the turnstile arm and resist rotational movement of the tubular section about the common axis when torque is applied to the jump-deterrent section.

16. The method of claim 14, wherein:

the tubular section and the jump-deterrent section are integrally molded or additively manufactured as a single rigid piece of material; and the tubular section defines an open first end through which the turnstile arm can extend, the open first end having molded screw threads extending therearound, the screw threads being molded.

17. The method of claim 14, wherein the jump-deterrent section comprises an arc-shaped rigid flap extending longitudinally along the tubular section.

18. The method of claim 14, wherein the attachment assembly includes a plurality of clamping locations spaced apart along the common axis, each clamping location including at least one independently adjustable clamp configured to engage the turnstile arm and resist rotational movement of the tubular section about the common axis when torque is applied to the jump-deterrent section.

19. The method of claim 14, wherein the tubular section and the jump-deterrent section are integrally molded as a single rigid body;

the tubular section defines an open first end through which the turnstile arm extends, the open first end having molded screw threads extending therearound; and the jump-deterrent section comprises a semicircular rigid flap extending longitudinally between the open first end and the open second end and having a largest radial distance from the common axis at a center portion between the open first end and the open second end.

* * * * *